United States Patent [19]

Farmer

[11] Patent Number: 5,323,462
[45] Date of Patent: Jun. 21, 1994

[54] CATV SUBSCRIBER DISCONNECT SWITCH
[75] Inventor: James O. Farmer, Lilburn, Ga.
[73] Assignee: Scientific-Atlanta, Inc., Norcross, Ga.
[21] Appl. No.: 975,237
[22] Filed: Nov. 12, 1992

Related U.S. Application Data

[63] Continuation of Ser. No. 446,604, Dec. 6, 1989, abandoned, which is a continuation-in-part of Ser. No. 166,302, Mar. 10, 1988, Pat. No. 4,912,760, which is a continuation-in-part of Ser. No. 279,619, Dec. 5, 1988, Pat. No. 5,014,309.

[51] Int. Cl.$^5$ ............... H04N 7/167; H04K 3/00
[52] U.S. Cl. ...................................... 380/7; 380/10; 380/15; 380/20; 455/1
[58] Field of Search ............... 380/7, 10, 15, 20; 358/86, 349; 455/1, 4, 26.1

[56] References Cited

U.S. PATENT DOCUMENTS

| Re. 29,997 | 5/1979 | den Toonder . | |
|---|---|---|---|
| 3,202,758 | 8/1965 | Brownstein . | |
| 3,760,097 | 9/1973 | Burroughs et al. . | |
| 3,896,262 | 7/1975 | Hudspeth et al. . | |
| 3,899,633 | 8/1975 | Sorenson et al. . | |
| 3,989,887 | 11/1976 | Murphy . | |
| 4,019,413 | 5/1978 | Herman . | |
| 4,039,954 | 5/1979 | den Toonder . | |
| 4,148,064 | 4/1979 | Reed . | |
| 4,326,289 | 4/1982 | Dickinson . | |
| 4,334,322 | 8/1982 | Clark, III . | |
| 4,336,554 | 6/1982 | Okada et al. . | |
| 4,342,119 | 7/1982 | Seidl . | |
| 4,343,042 | 8/1982 | Schrock et al. . | |
| 4,367,557 | 1/1983 | Stern et al. . | |
| 4,434,436 | 2/1984 | Kleykamp et al. . | |
| 4,450,481 | 5/1984 | Dickinson . | |
| 4,461,032 | 7/1984 | Skerlos | 455/4 |
| 4,498,193 | 2/1985 | Richardson . | |
| 4,521,809 | 6/1985 | Bingham et al. . | |
| 4,550,341 | 10/1985 | Naito | 380/10 |
| 4,651,204 | 3/1987 | Uemura . | |
| 4,685,131 | 8/1987 | Horne | 380/20 |
| 4,710,955 | 12/1987 | Kauffman | 380/10 |
| 4,716,588 | 12/1987 | Thompson et al. | 380/20 |
| 4,739,510 | 4/1988 | Jeffers et al. | 380/15 |
| 4,769,838 | 9/1988 | Hasegawa . | |
| 4,771,458 | 9/1988 | Citta et al. | 380/20 |
| 4,825,468 | 4/1989 | Ellis . | |
| 4,837,820 | 6/1989 | Bellavia, Jr. . | |
| 4,864,614 | 9/1989 | Crowther | 380/10 |
| 4,903,297 | 2/1990 | Rist et al. . | |

FOREIGN PATENT DOCUMENTS 178758 4/1986 European Pat. Off. .
59-61384 4/1984 Japan .

OTHER PUBLICATIONS

"TGT-The Affordable Solution" (article), AM Cable TV Industries, Inc.
"Addressable Tap IT-1-SM" (article), Control Com Inc.
"Tier Guard" (article), E-Com Corporation.

Primary Examiner—Stephen C. Buczinski
Attorney, Agent, or Firm—Banner, Birch, McKie & Beckett

[57] ABSTRACT

Television service denial apparatus comprises a microprocessor controller for controlling the generation of a control signal waveform. The control signal toggles a program denial device between first and second conditions. The program denial device, responsive to the control signal waveform, only periodically outputs a television signal spectrum to which a sophisticated television receiver be a device having only 20 dB of signal isolation. In one embodiment, the program denial device comprises a signal modulator for modulating an incoming television signal spectrum including one continuous wave carrier channel having no superimposed video. A character generator, responsive to the microprocessor, generates a control signal waveform for controlling the operation of the signal modulator. Consequently, while all television channels are obfuscated by the signal modulator during a period of service denial, the continuous wave carrier is modulated with a message signal for delivering a message to the subscriber on the continuous wave carrier channel indicating why service is disconnected.

18 Claims, 6 Drawing Sheets

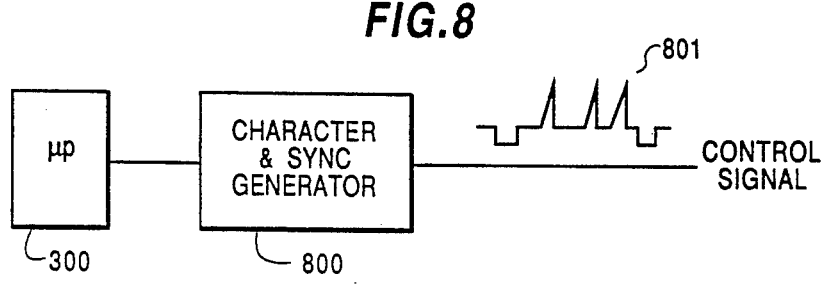
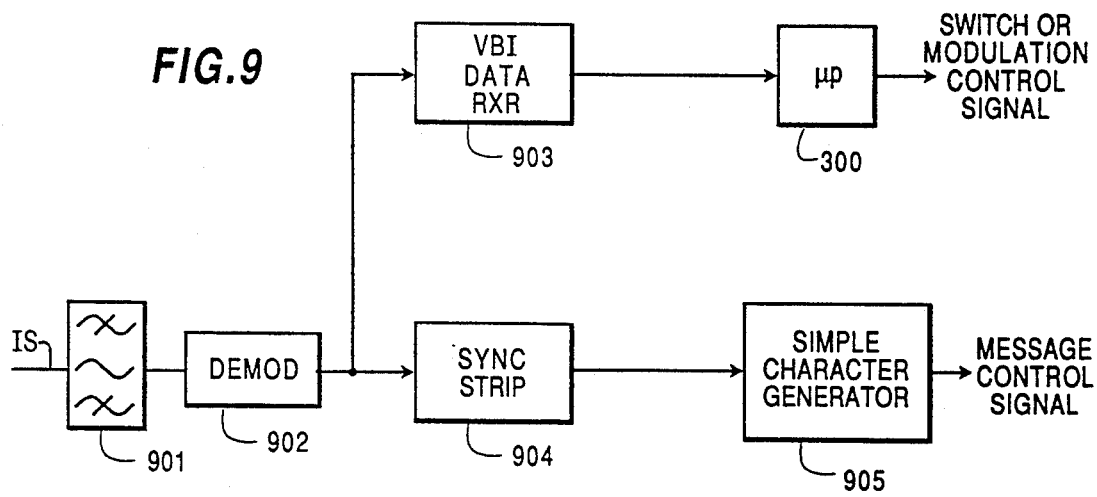

CATV SUBSCRIBER DISCONNECT SWITCH

CROSS-REFERENCE TO RELATED APPLICATIONS

This is a continuation, of application Ser. No. 07/446,604, filed Dec. 6, 1989, now abandoned, which is a continuation-in-part of U.S. applications Ser. No. 166,302 now U.S. Pat. No. 4,912,760, and Ser. No. 279,619, now U.S. Pat. No. 5,014,309 filed Mar. 10, 1988 and Dec. 5, 1988 respectively, and entitled "Off-Premises Cable Television Channel Interdiction Method and Apparatus," and is related by subject matter to the following U.S. patent applications filed concurrently herewith: U.S. application Ser. No. 446,602 entitled "Optimum Amplitude and Frequency of Jamming Carrier in Interdiction Program Denial System, now U.S. Pat. No. 5,142,574;" U.S. application Ser. No. 446,603, now U.S. Pat. No. 5,208,854, entitle "Picture Carrier Controlled Automatic Gain Control Circuit for Cable Television Interdiction or Jamming Apparatus," and U.S. application Ser. No. 446,695, now U.S. Pat. No. 5,109,286, entitled "CATV Reverse Path Manifold System."

BACKGROUND OF THE INVENTION

1. Technical Field

This invention relates generally to the field of cable television systems and, more particularly, to a method and apparatus for selectively denying service in such systems.

2. Description of the Prior Art

At a headend of a cable television system, a scrambler is normally provided to encode premium television channels. The applied scrambling precludes reception by an unauthorized converter/decoder at a connected premises. Data representing channels or tiers of programming are addressably transmitted to a particular converter/decoder and stored in an authorization memory. As a result of the addressed transmission, a subsequently transmitted program is authorized in that the decoder portion of the converter/decoder will be selectively enabled to decode the scrambled premium channel or program.

Several varieties of scrambling techniques are applied today. Each manufacturer has its own scheme which may be incompatible with others. Nevertheless, most popular scrambling systems today are based on sync suppression, in which the sync information is hidden from the television receiver's sync separator, usually by moving it to a level occupied by picture information (moving the sync tip to an equivalent picture level of 40 IRE units is common). Some systems modulate the picture carrier with a sine wave phased to suppress the horizontal blanking interval. Most systems today switch to the suppressed level at the beginning of the blanking interval and switch out at the end. Most though not all suppress the vertical blanking interval. Some systems dynamically invert the video, either on a line-by line or a field-by-field basis. This must be done carefully to avoid artifacts caused by inverting and reinverting around different levels, and by differential gain and phase of the system. Synchronization is restored either by the provision of synchronous amplitude modulated pulses on the sound carrier, digital information placed in the vertical interval or phase modulation on the picture carrier.

The provision of one scrambler per premium channel at the headend and the inclusion of a descrambler in each converter/decoder at the premises of the television receiver is particularly expensive. Furthermore, providing the converter/decoder on premises has turned out to be a great temptation to service pirates who imaginatively seek ways to receive premium channels. As a result, cable television equipment manufacturers have entered into a veritable war with such pirates resulting in complicated service authorization protocols in some instances involving multiple layers of encryption by both in-band and out-of-band data transmission further increasing the costs of the converter/decoder.

The cable industry has begun to look for new technology and to take a second look at technology developed in the early stages of development of cable television, such as the application of negative and positive traps and more recent techniques such as interdiction.

Negative trap technology is viewed by many manufacturers as a viable alternative to sync suppression scrambling methods. A negative trap is basically a narrow band reject filter. Traps are located at the drop to a subscriber's dwelling and attenuate a significant portion of a premium television channel rendering that channel unusable by the subscriber.

In the conventional embodiment, negative traps are made using L-C filter techniques. The result is a notch with finite quality Q and finite shape factor. In the case of a single channel negative trap, the center of the notch is usually located at the picture carrier frequency of the channel to be removed. This technique, sometimes called a static negative trap, requires attenuation at the picture carrier of at least 60 dB to be effective.

Negative trap systems have several advantages that make them attractive for cable television applications. One primary advantage is the ability to deliver a broadband cable television spectrum to the subscriber's converter/decoder. Conventional sync suppression systems utilize descrambling set-top converter/decoders which deliver inherently narrowband signals. Negative traps are usually mounted outside the subscriber's home (typically at the tap) and thereby minimize the exposure associated with placing hardware inside the subscriber's dwelling. Finally, some cable television operators view the negative trap as a more secure means of subscriber control than is sync suppression, as picture reconstruction is viewed as substantially more difficult.

However, the negative trap system requires hardware in locations where no revenue is generated for the cable television system. Moreover, negative traps have several severe practical limitations. L-C band reject filters have Q and shape factor limitations. Quality factors Q for L-C filters may be limited to around 30. This means that for a negative trap located at channel 8 (picture carrier at 181.25 MHz) the 3 dB bandwidth of a negative trap is typically 6 MHz (or the bandwidth of a baseband television channel). This trap would result in significant deterioration of the lower adjacent channel. Then the television receiver tuned to the lower adjacent channel, rather than having to content with a 15 dB picture-to-sound ratio, may have to contend with a sound carrier reduced an additional 6 dB or so. Frequency stability as a function of time and temperature is also a significant concern. Many cable television system operators have instituted a regular negative trap change-out program based on the assumption that after a certain period of time and temperature cycling, frequency drift will render negative traps useless.

Positive trap systems also utilize a narrow band-rejection notch filter. However, unlike negative trap systems which are used to attenuate or trap a premium channel transmission, the notch filter is used to restore the premium television channel. In this scenario, an interfering signal is placed inside the premium television channel at the cable television headend. This interfering signal is then removed at the subscriber's dwelling by use of the notch filter. Ideally this notch filter removes only the interference without removing a significant amount of television information.

Parallel to developments of different types of trapping or jamming systems, the cable industry has also evidenced a requirement to move a converter or descrambler outside of a subscriber's home to a location which is more secure from signal piracy. This concept is not new; for example, an addressable tap system was developed by Scientific Atlanta in 1983 or 1984 in which an off-premises "tap", addressed by a headband control system, gates a premium channel into the subscriber's premises. However, such products did not prove to be viable alternatives to inside-the-home signal descrambler/converters.

Another scrambling system proposed by Scientific Atlanta involved a technique of intentionally dropping a field of video signal on occasion such that an unauthorized recipient would not be able to view a properly synchronized image. Depending on how fast the subscriber's television receiver may restore synch, the image would appear to flash on and off.

A relatively recent technique for premium channel control is the interdiction system, so-called because of the introduction of an interfering signal at the subscriber's location. Most embodiments consist of a pole-mounted enclosure located outside the subscriber's premises designed to serve four or more subscribers. This enclosure contains at least one microprocessor controlled oscillator and switch control electronics to secure several television channels. Control is accomplished by injecting an interfering or jamming signal into unauthorized channels from this pole-mounted enclosure.

For efficiency's sake, it is known to utilize one oscillator to jam several premium television channels. This technique not only reduces the amount of hardware required, but also maximizes the system flexibility. The oscillator output jamming signal frequency is periodically moved from channel to channel. Consequently, the oscillator is frequency agile and hops from jamming one premium channel frequency to the next.

One such system is known from U.S. Pat. No. 4,450,481 in which a single frequency agile oscillator provides a hopping gain-controlled jamming signal output to four high frequency electronic switches. In this known system, each switch is associated with one subscriber drop. Under microprocessor control and depending on which subscribers are authorized to receive transmitted premium programming, the microprocessor selectively gates the jamming signal output of the single oscillator via the switches into the path of the incoming broadband television signal to each subscriber. Consequently, an unauthorized subscriber upon tuning to a premium channel will receive the premium channel on which a jamming signal at approximately the same frequency has been superimposed.

In the known system, it is indicated that sixteen channels may be jammed by a single voltage controlled frequency agile oscillator. With respect to one premium channel, this translates to a situation in which the jamming signal can only be present one sixteenth of the time or an approximately 6% jamming interval. The rate of hopping is also indicated at 100 bursts per second of jamming signal at a particular frequency, or a 100 hertz hopping rate. Consequently, the effectiveness of the jamming signal is questionable.

It is important that an interdiction system jamming signal frequency be placed as close as possible to the picture carrier frequency. Otherwise, adjacent channel artifacts or incomplete jamming will result. In the known system, the jamming signal is intentionally placed below the video carrier and consequently approximate to an adjacent channel producing adjacent channel artifacts.

To overcome the difficulties of such prior art interdiction systems and in accordance with parent applications U.S. Ser. Nos. 166,302 and 279,619, and concurrently filed applications referenced above and incorporated herein by reference, an improved interdiction system is described. For example, cost reduction is achieved for each subscriber unit or common circuitry associated with several subscriber unit as, for example, is provided by FIG. 2 of U.S. application Ser. No. 166,302.

In most if not all of these systems for scrambling or jamming CATV channels, situations arise when it is appropriate to deny service to a particular subscriber or even deny service generally to all subscribers. The more obvious occasions for a service disconnect are the subscriber's failure to pay for service or in response to the request of a subscriber who no longer desires service. Other occasions may relate to emergency conditions such as those caused by weather, national defense or act of God.

Typically, a disconnect command is transmitted to a subscriber decoder, converter, jammer or interdiction device over a special carrier or is imbedded in the vertical blanking interval of a transmitted video carrier. Upon receipt, the subscriber unit decodes the command, determines the command is to be performed by the particular unit and executes the command. The command is executed, for example, by turning off power to signal conversion apparatus, by operating a subscriber disconnect relay or switch or by turning off power to amplifier circuits or by other techniques known in the art.

Generally it is a principle of design of any such subscriber disconnect arrangements that as much as sixty or seventy dB of isolation be provided by the isolating device. For example, when power is turned off to signal conversion apparatus, there should only be a highly limited amplitude of signal passed to the subscriber. This is equally true for disconnect relays, powered down amplifiers, or any other known disconnect techniques. Providing such a great amount of isolation may be expensive as it may require additional equipment, circuits, or special control to accomplish.

Thus there exists a problem with present disconnect arrangements in their difficulty of achieving adequate isolation with an economical device. When service is disconnected, it is desirable to reduce the signal level reaching the subscriber's television receiver so that, under worst case conditions, the subscriber's television receiver will not receive a viewable image, no matter how sophisticated the receiver. These worst case conditions include simultaneously encountering a television receiver having excellent noise rejection performance, a low noise preamplifier installed in the subscriber's home wiring, the subscriber's being connected to a short drop cable having low attenuation, and a CATV distribution network providing a relatively high power level radio frequency input signal to the subscriber's premises. Under these conditions, it is difficult to provide an economical switch with adequate isolation which can guarantee that an unviewable image will be received.

SUMMARY OF THE INVENTION

It is an object of the present invention to provide an efficient, cost-effective apparatus and method of denying service to subscribers of a cable television system.

It is a further object of the present invention to provide an improved service denial device while reducing the degree of isolation provided by the device.

It is a further object of the present invention to provide an improved service denial device which permits the subscriber to view predetermined timed portions of a scrambled or encoded broadcast.

It is a further object of the present invention to provide an improved service denial device which functions at the same time to permit a personal subscriber message to be displayed indicating why service is being denied.

In accordance with achieving the objects of the present invention, it is a principle thereof to provide a service denial device of limited isolation. In particular, the isolation provided by any such device may be only thirty or forty dB instead of sixty or seventy dB. In fact, only 20 dB of isolation may be necessary in some situations. In accordance with the principles of the present invention, the device is repeatedly activated and deactivated instead of being permanently activated during the period of service denial.

In one embodiment implemented in an off-premises interdiction device as first suggested in our patent application U.S. Ser. No. 166,302, a service denial switch is connected in series with a radio frequency signal amplifier. Power to the amplifier and control of the switch are determined by a microprocessor of a subscriber unit of the system. In accordance with the principles of the present invention, the switch only need be an inexpensive PIN or simple diode. The microprocessor during the period of service denial either outputs or controls the generation of a control signal wave having a longer activation period than a deactivation period at a toggling frequency, for example, between 30 hertz and 15 kilohertz. In other words, the maximum length of time a service denial device should be maintained in either an activated or a nonactivated state should be equivalent to about one television field, or about 16.7 milliseconds. The minimum time the device should be in one or the other condition should be on the order of the duration of one synch pulse, for example, 4.7 microseconds.

The object of the on/off toggling or switching of service denial is to preclude even a sophisticated television receiver from achieving synchronization to the incoming video signal. The selected toggling frequency should avoid 15,734 hertz, the horizontal line rate, its harmonics or its subharmonics. Otherwise, a sophisticated television receiver may be able to obtain synch.

When any subscriber unit is removed from service, the subscriber unit responds in the same manner to a service disconnect command as in any known technique in that a command is received, verified and decoded. However, in accordance with the present invention, the service denial device is not maintained in a permanently on condition during the period of service denial. Rather, the device is activated and deactivated at a predetermined rate which precludes a normal television receiver from achieving synchronization. As a result, an undiscernible image will appear on a television screen.

In accordance with another embodiment of the present invention, the respective timing intervals when a control signal is provided for activating and deactivating the program denial device are randomly varied. The length of time the device is activated or deactivated (for example, a service denial switch is open or closed) may be randomly varied within the limits specified above to thwart a service pirate from obtaining unauthorized service and provide additional radio frequency signal security. A program of the microprocessor for controlling the service disconnect switch of the subscriber unit of the above-described off-premises interdiction system may determine the random control signal waveform it outputs to the program denial device.

At the same time the program denial switch is activated and deactivated in this embodiment, the microprocessor may simultaneously provide the same control signal as a power down signal to the radio frequency signal amplifier. In this manner, both the diode switch and the amplifier form a program denial device. Furthermore, the switch could be eliminated from the device and the powering down of the amplifier alone may serve as the service denial device.

In accordance with a still further embodiment of the present invention, an amplitude modulator or simple multiplier circuit may replace the service disconnect switch. The amplitude modulator or multiplier multiplies the incoming radio frequency signal with a multiplier control signal which varies from no signal level to a level representing one. The microprocessor of the subscriber unit may output the same waveform of the previously described embodiment as the multiplier control signal waveform of this embodiment or may output practically any waveform for obfuscation involving varying depths of modulation.

In either embodiment involving a switch or involving a signal multiplier, the signal for controlling the amplitude modulator or multiplier may be provided for a relatively long period, for example, for thirty seconds and removed for a relatively short period, for example, for ten seconds. In this manner, a television signal will appear for a brief period of time and become distorted for a longer period of time operating as a teaser to a subscriber, encouraging the subscriber to subscribe to otherwise unauthorized services. Furthermore, the thirty second/ten second intervals may be varied in a random manner by a program of a controlling processor.

This concept of teasing a would-be subscriber has broader application than serving as a service denial device and may be more generally implemented, for example, as a way of controlling a scrambling process for scrambling premium channel program transmissions. This teasing technique differs from a preview period known in the art in that the timed control of scrambling is implemented during the entire period of the premium program as a teaser and not just for a predetermined preview period.

Furthermore, in accordance with the present invention, and as an embellishment of the program denial device involving an amplitude modulator or multiplier, a separate private message channel may be implemented without considerable circuit modification. Between the microprocessor and the modulator is provided a character generator which outputs a synchronized video waveform with an embedded character data message, for example, stating why the service to the customer has been denied. This control signal then is multiplied times the incoming broadband waveform and effectively scrambles the waveform. At the same time, the message will be modulated on a continuous wave carrier channel reserved for personal messages. In this instance, the control waveform provides synch and causes a personal message to appear on an otherwise blank background.

To reduce costs associated with providing a character generator which provides a synchronized waveform output with embedded character messages, a more simplified character generator having no synch generation capability may be applied in this embodiment with some modification. A signal on a particular carrier channel transmitted toward a subscriber includes data embedded in the vertical blanking interval. It is passed by a channel filter and recovered at a demodulator. The demodulated channel is provided to a synch stripper and to a vertical blanking interval data recovery circuit. The recovered data drives a microprocessor to provide a message output to a character generator having no synch generation capability coupled to the synch stripper. The synch stripper strips synch from the particular demodulated channel for synchronizing the character generator. This character generator then does not provide a synchronized waveform output and so may be less expensive to provide. Yet a synchronized output waveform for controlling the multiplier is output from the character generator. Furthermore, the microprocessor may either provide a modulation control signal or control a service denial switch as described above in connection with the first described embodiment of the present invention.

The advantages and features of the present method and apparatus for providing an improved service denial and control device for a jamming or interdiction or other CATV scrambling system will now be explained in the following detailed description of the invention with reference to the drawings.

FIG. is a block schematic diagram of one subscriber module comprising a microprocessor for selectively actuating and deactuating a program denial device at a periodic rate according to the present invention comprising a service denial switch and a radio frequency amplifier.

Figure 3:
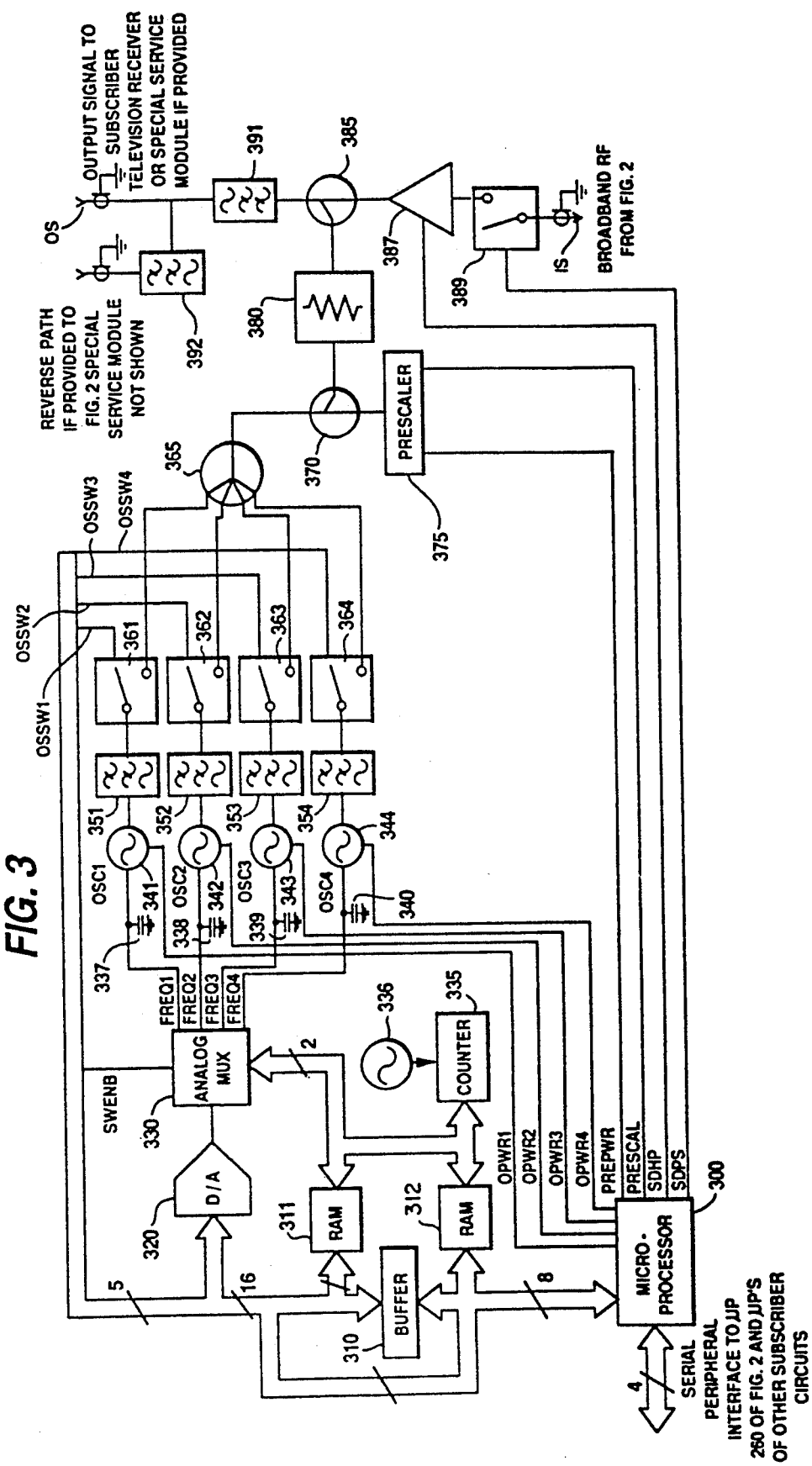
Figure 4:
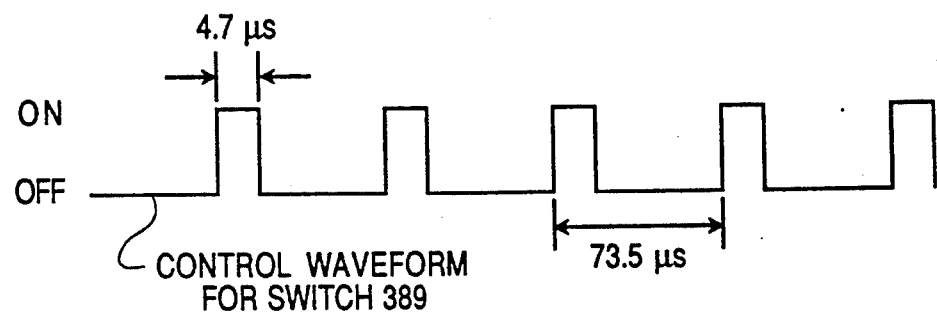

FIG. 4 is an exemplary control signal waveform output of the microprocessor of FIG. 3 for actuating and deactuating the program denial device shown in FIG. 3 during a period of service denial.

Figure 5:
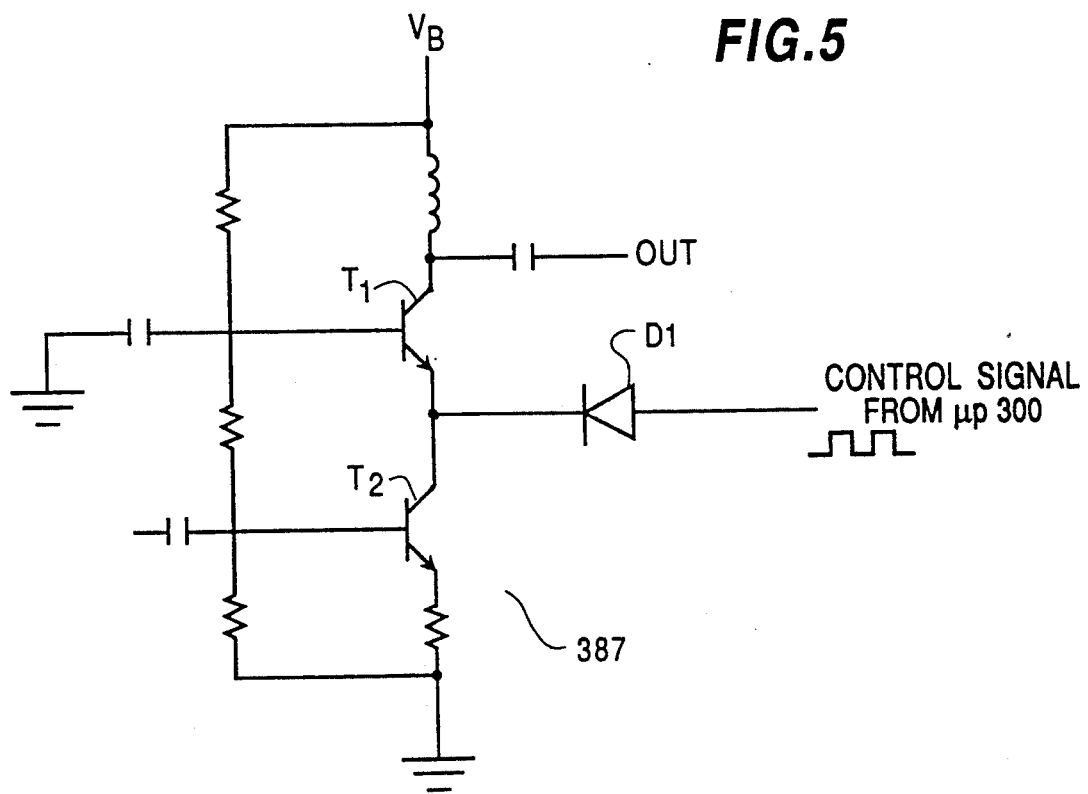

FIG. 5 is a schematic circuit diagram of the radio frequency amplifier of FIG. 3 and a control arrangement therefor which meets the objectives of the present invention.

Figure 6:
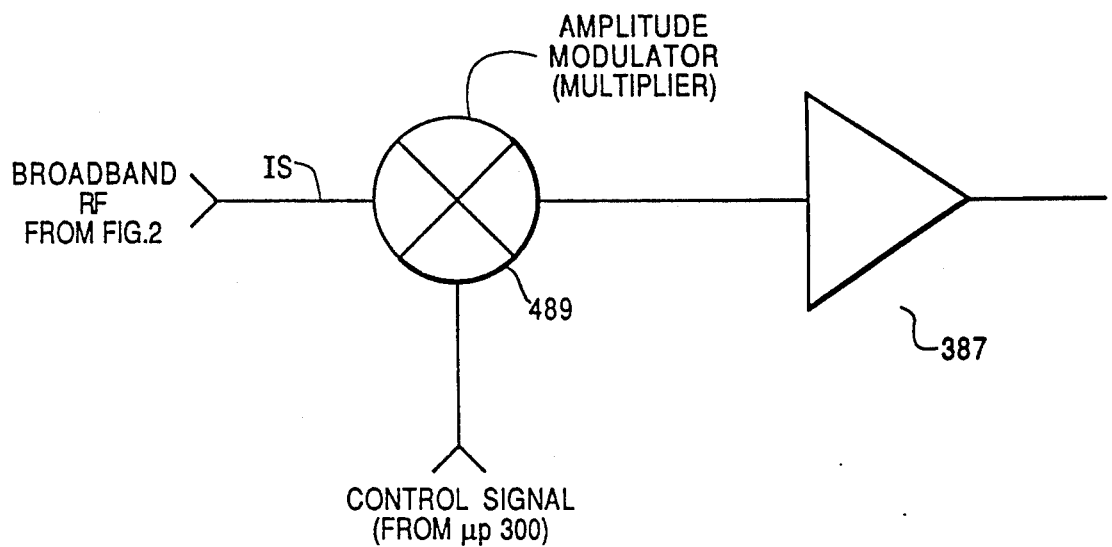

FIG. 6 is a schematic block diagram of a program denial device according to the present invention in which the service denial switch is replaced by an amplitude modulator or multiplier.

Figure 7:
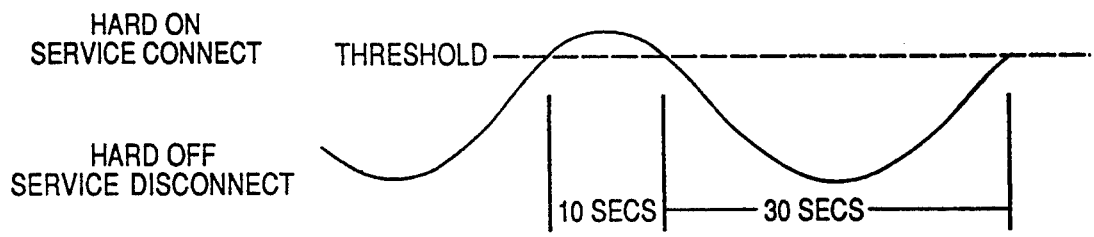

FIG. 7 is a suggested waveform output of the microprocessor whereby service is provided for a brief period of time and denied for a longer period of time to tease a subscriber into purchasing service.

FIG. 8 is a schematic block diagram of one arrangement for providing a control signal to the amplitude modulator shown in FIG. 6 so that a personal message may be delivered to the subscriber explaining why service has been denied.

FIG. 9 is a schematic block diagram of an alternative arrangement for providing a personal message and for controlling either a service denial switch according to FIG. 3 or an amplitude modulator according to FIG. 6.

DETAILED DESCRIPTION OF THE INVENTION

Now the service denial device and method of the present invention will be discussed in the context of the off-premises cable television channel interdiction apparatus first disclosed in U.S. patent application Ser. No. 166,302, filed Mar. 10, 1988, the disclosure of which is herein incorporated by reference in respect to those features not described by the present specification. On the other hand, the present invention is in principle not limited to service denial control circuitry for an interdiction system but is also applicable to service denial control circuits provided in positive and negative trap systems, synch suppression systems and in any other system in which service is denied responsive to a command from a headend at an off-premises location proximate to or on a subscriber premises.

A detailed discussion of the interdiction system in which the present invention may be implemented is provided in U.S. parent application Ser. Nos. 166,302 and 279,619 and in related copending applications. Topics related to interdiction systems such as jamming frequency and gain control will not be addressed in great detail herein.

Figure 1:
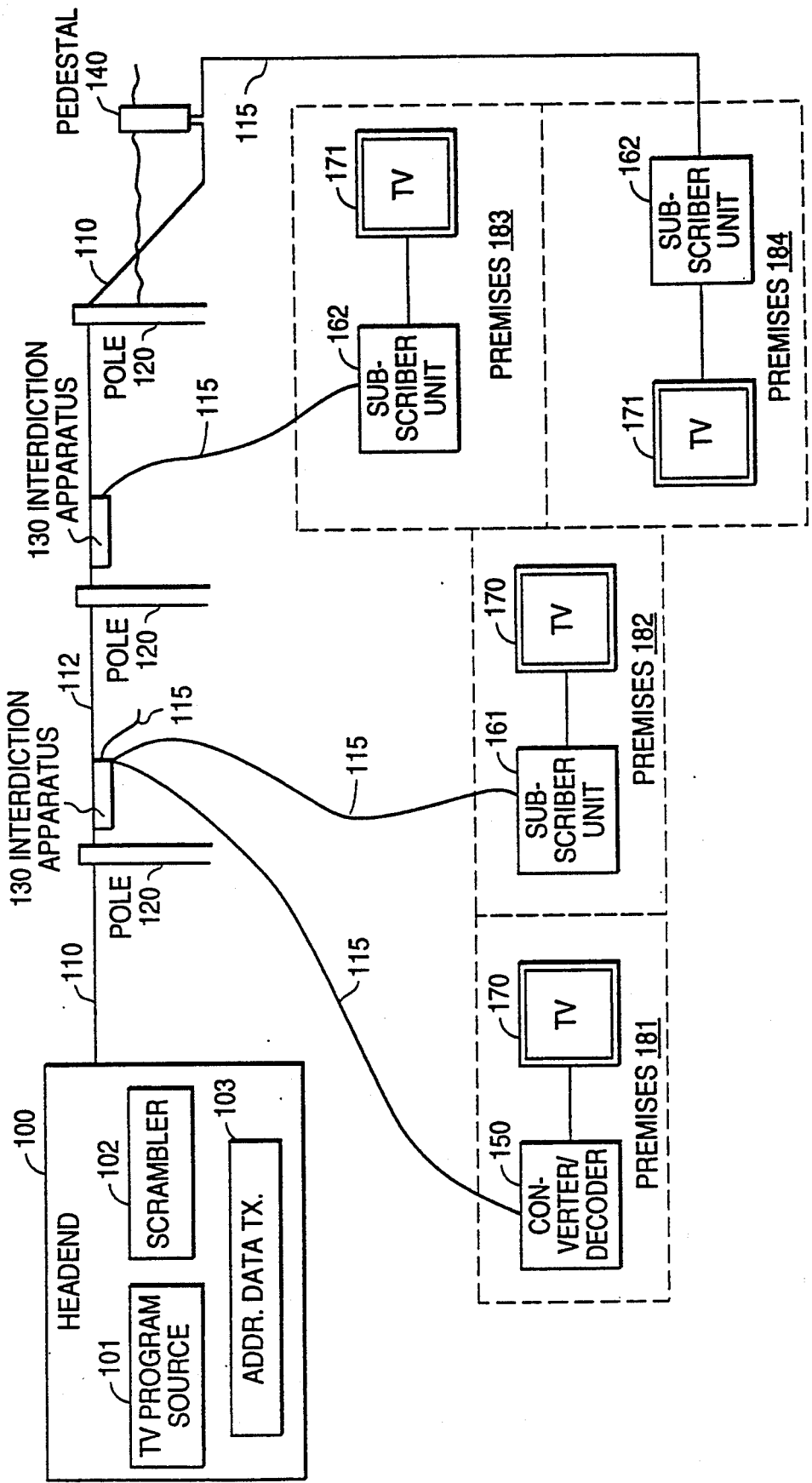
FIG. 1 is an overall system block diagram showing the service denial device and technique of the present invention implemented in an interdiction cable television system.

Referring more particularly to FIG. 1, there is shown a general block diagram of a cable television system employing the principles of the present invention. By cable television system is intended all systems involving the transmission of television signals over a transmission medium (fiber optic cable or coaxial cable) toward remote locations. For example, a cable television system may comprise a community antenna television distribution system, a satellite signal distribution system, a broadcast television system, a private cable distribution network, either industrial or educational, or other forms of such systems. Each remote location of a television receiver may comprise the location of a particular subscriber to a subscription television service, plural subscribers, single subscribers having plural television receivers or private locations in a private cable distribution network. Consequently, the term subscriber, when used in this application and the claims, refers to either a private subscriber or a commercial user of the cable television system. Headend 100 as used in the present application and claims is defined as the connecting point to a serving cable or trunk 110 for distributing television channels over feeder line 112 to drop 115 and finally to subscriber locations. For reference purposes, an Electronic Industries Association (E.I.A.) standard cable television frequency allocation scheme is employed and referred to herein; however, by means of the following disclosure of the present invention, one may apply the principles to other known standards or non-standard frequency allocations. Furthermore, a National Television Subcommittee (N.T.S.C.) standard composite television signal amplitude modulated onto a radio frequency carrier is generally considered in the following description; however, the principles of the present invention apply equally to other standard and non-standard television signal formats, including proposed high definition television formats.

Headend 100 comprises a source of television programming 101. Television program source 101 may be a satellite television receiver output, a program produced by a television studio, program material received over a microwave or broadcast television link, a cable television link output, or any other source of television programming consistent with the present invention. The program source material need not be limited to conventional television but may comprise teletext, videotext, program audio, utility data, or other forms of communication to be delivered to a remote location over the serving cable or trunk line 110 and subsequently over feeder line 112 and drop line 115.

Conventionally, trunk line 110, feeder line 112, and drop line 115 are constructed of coaxial cable. For higher performance, any one of these lines could be a fiber optic cable. Preferably, due to the cost of the installation and the need for a high quality initial transmission from headend 100, trunk line 110 is typically the only line constructed of fiber optic cable.

Program material provided by source 101 may be premium or otherwise restricted or desirably secured from receipt at unauthorized receiver locations. To this end, each channel or program to be secured is generally scrambled by scrambler 102 provided at headed 100. By the use of the term premium channel or premium programming in the present application and claims is intended a channel or program which is desired to be secured from unauthorized reception either because of its premium or restricted status.

Normally, all premium programming in known cable television systems is scrambled or protected by negative traps. However, in accordance with interdiction system technology, premium programming is transmitted in the clear, and interdiction is applied at off-premises interdiction apparatus 130 to jam reception of unauthorized premium programming.

Consequently, during a transition period in which headend 100 provides scrambled television programming as well as premium programming in the clear, a scrambler 102 will be provided so long as converter/decoders 150 are provided to subscribers for unscrambling scrambled program transmission. In certain instances, converter/decoders 150 may be entirely replaced by interdiction apparatus 130.

Also, at the headend, there is normally an addressable data transmitter 103 for transmitting global commands and data to all subscribers or addressed communications for reception by a unique subscriber. Such data transmission may be conducted over a separate data carrier from the cable television spectrum, for example, at 108.2 megahertz. It may also be transmitted over an unused default carrier channel from the television spectrum. Global commands generally take the form of operation code and data while addressed communications such as a subscriber disconnect command further comprise the unique address of a particular subscriber.

In another alternative embodiment, such communications may take the form of in band signals sent with a television channel superimposed upon an audio carrier during, for example, the vertical blanking interval of the video signal. Such data communications further complicate data reception at interdiction apparatus 130 and are desirably eliminated. However, in band signaling is sometimes required for the operation of certain converter/decoders 150 known in the art.

Commands then to deny service to a particular subscriber may be transmitted in-band or on a separate data carrier and typically involve transmitting a unique address of a particular subscriber unit, a command, and data. Data transmission may be optional, and, if provided, may signal the converter to display a particular message to the subscriber as to why service is being denied. The decoders 150 receive the command, decode it, determine if the command is to be acted on, and if so perform the desired action such as operate a service denial device and display a message.

Consequently, headend 100, cable television serving cable or trunk line 110, and converter/decoders 150 and television receivers 170 at a typical subscriber premises 181 comprise a typical cable television system. Channel program or authorization data is transmitted via an addressable data transmitter 103 over a trunk line 110 on feeder line 112. At a pole 120 or from a pedestal 140 at underground cable locations, the serving CATV signal is dropped via drop 115 to a subscriber location. Drop 115 is connected to a conventional converter/decoder 150 which serves several functions. Responsive to an addressed communication from headend transmitter 103, channel or program authorization data is updated in an authorization memory if the address associated with the addressed communication matches a unique address of the subscriber decoder 150. For example, the subscriber address may comprise a plurality of bits over and above the actual number of subscribers in a system. Additional bits, if provided, may insure the security of the address. The premium channel or program is then stored in the authorization memory of the converter/decoder 150. Television programming is normally converted to an otherwise unused channel such as channel 3 or 4 of the television spectrum by a converter portion of converter/decoder 150. Its premium status is checked against the data stored in authorization memory. If the programming is authorized, the decoder portion of the converter/decoder is enabled to decode authorized scrambled premium programming.

The provided television receiver may be a conventional television receiver 170 or may be a so-called ready television receiver 171. Because of the advent of cable ready television receivers 171, there is no longer a requirement at a subscriber premises 181 for the converter portion of the converter/decoder 150 as a converter is built into such television receivers.

In accordance with a cable television system provided with off-premises interdiction apparatus 130 of FIG. 1, a housing is mounted on a strand supporting cable 112, to a pole 120, or provided via a pedestal 140 or mounted outside the premises on one exterior wall. Inside the housing is common control circuitry for tapping into the broadband television and data transmission spectrum. Referring to the first pole 120 from the left of FIG. 1, there is shown a strand-mounted apparatus serving at least one drop or, per FIG. 1, two drops 115 to subscribers. Altogether, four or more subscribers and up to four or more drops 115 may be served by interdiction apparatus 130. Besides the common control circuitry, up to four (or more) plug-in subscriber modules may be provided for one housing. Also, if desired, additional services may be provided via other plug-in units of the housing such as impulse pay-per-view, subscriber polling involving two-way data communication, meter reading, energy management or other services.

Desirably, all equipment 161 may be removed from the subscriber premises 182. However, for the provision of additional services, some on-premises equipment may be unavoidable. For purposes of this description, premises 182 will be assumed to include at least one non-cable ready conventional television receiver 170. Consequently, subscriber equipment 161 must at least comprise a tunable converter for converting a received cable television channel to an unused channel such as channel 3 or 4 for reception on conventional television receiver 170.

Power for interdiction apparatus 130 may be provided over the cable from the headend 100 or be provided via the subscriber drop 115 or by a combination of such means. Foreseeably, power may be even provided by rechargeable means such as solar cells or other external or replaceable internal sources such as batteries. Consequently, subscriber equipment 161 may also comprise a source of power for interdiction apparatus 130.

Interdiction apparatus 130 may be secured in a tamper-resistant housing or otherwise secured such as in a locked equipment closet of an apartment complex. If located in a place exposed to the elements, the housing should be water-tight. Also, the housing should be designed to preclude radio frequency leakage.

At premises 183, the subscriber is presumed to have a cable ready television receiver 171. Consequently, subscriber unit 162 may be entirely eliminated or comprise simply a power feed to interdiction apparatus 130.

Premises 184 pictorially represents a subscriber location served by an underground cable 110 via a serving pedestal 140. Other pedestals (not shown) are for housing cable distribution amplification and branching equipment in buried cable installations. Pedestal 140 may comprise an off-premises housing for interdiction apparatus 130. Subscriber equipment 162 may comprise a converter, an additional service device and a power unit as described in reference to subscriber equipment 161 or nothing at all as described in reference to subscriber equipment 162.

Interdiction apparatus 130 is uniquely addressable by headend 100 just as is converter/decoder 150. If two bits of a plural bit unique subscriber address are associated with uniquely identifying one plug-in slot for one of four subscriber modules, common control circuitry may be uniquely addressed with remaining address data not used to secure the data communication. Just as premium programming is transmitted in the clear and since no data communication is necessarily required with a subscriber premises, a subscriber address need not be transmitted in a secure form. Nevertheless, address security may be desirable so long as converter/decoders 150 or other unique address requisite equipment is provided at a premises.

Interdiction apparatus 130 comprises addressable common control circuitry and up to four or more plug-in subscriber modules. Upon receipt of subscriber specific premium program or channel authorization data, the data are stored at interdiction apparatus 130. Interdiction apparatus 130 further may comprise automatic gain control circuitry of the common control circuitry. Channel interdiction circuitry associated with each subscriber module jams unauthorized premium programming dropped via a particular drop 115 to a particular subscriber. Consequently, interdiction apparatus 130 is reasonably compatible with addressable authorization data transmission known in the art. No scrambling of premium channels (and no resulting artifacts) is necessary or desirable. Furthermore, no additional forms of service security are necessary such as channel encryption, in-band channel or tier verification or other security measures. The would-be service pirate must attempt to remove a particular pseudo-randomly timed jamming signal placed at a varying frequency or seek to tamper with the off-premises apparatus 130 or derive a signal from shielded and bonded cable 110 which should likewise be maintained secure from radio frequency leakage.

Figure 2:
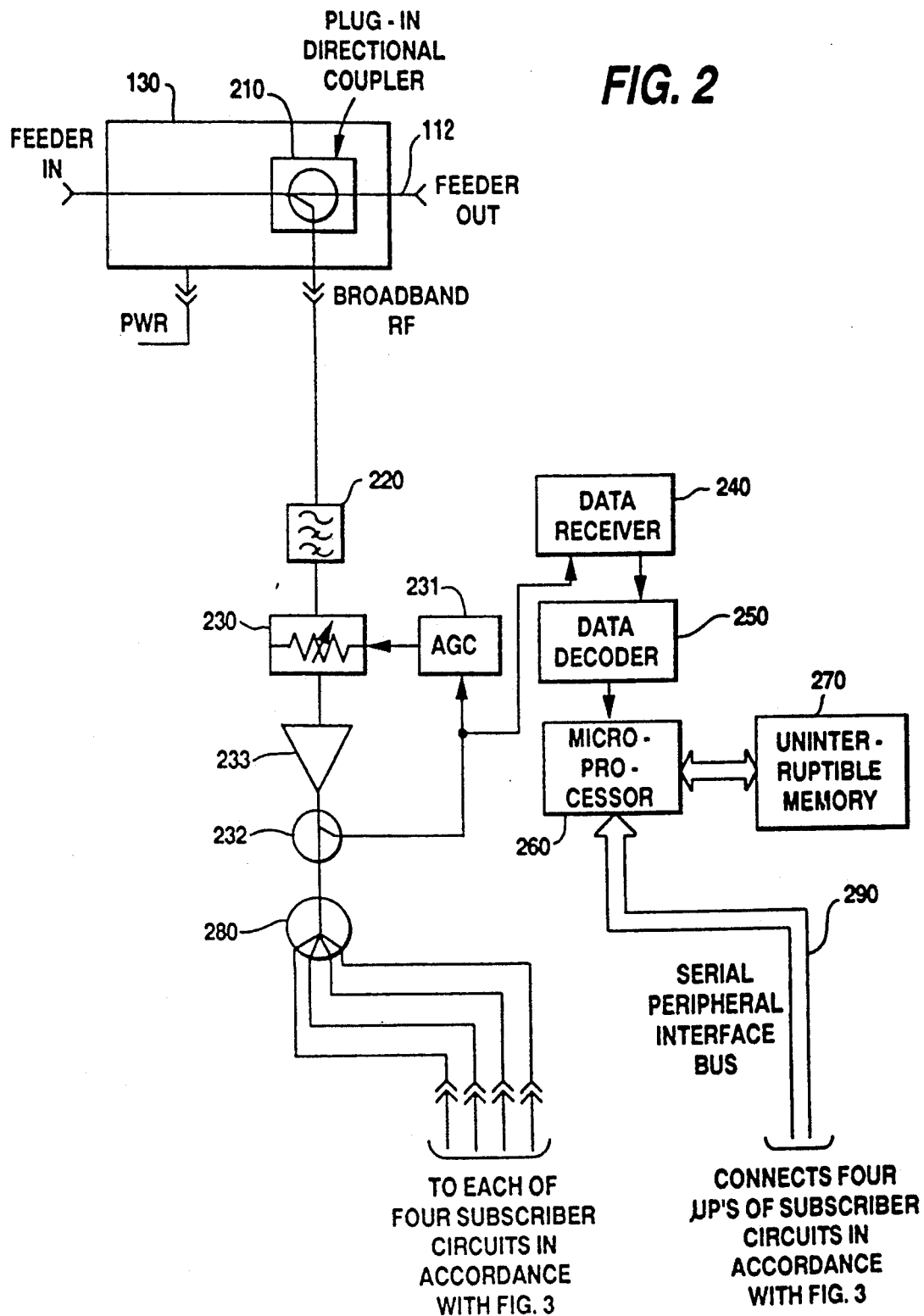
FIG. 2 is a block schematic diagram of an addressable common control circuit for a plurality of provided subscriber modules comprising a broadband signal tap, a microprocessor, a data receiver and decoder and an automatic gain control circuit.

The common control circuitry of interdiction apparatus 130 will now be described by means of the block diagram FIG. 2 for serving four subscriber modules in accordance with the block diagram FIG. 3. Referring particularly to FIG. 2, a feeder cable 112 is shown entering interdiction apparatus 130 at FEEDER IN and leaving at FEEDER OUT. Power PWR may be provided via the feeder cable or by means of subscriber drop 115 or locally by internal or external means. Depending on the source of power PWR, input power may be of alternating or direct current.

A directional coupler 210 which may be in the form of a plug-in module taps into the broadband serving cable 110. A broadband of radio frequency signals is thus output to highpass filter 220 which, in this embodiment, is optional. Highpass filter 220 passes a band of frequencies comprising at least the data carrier frequency or frequencies (in a bi-directional application) and the cable television channel spectrum. The cable television spectrum may comprise a frequency band from about 54 MHz to 550 MHz.

A common automatic gain control circuit as disclosed in FIG. 2 comprises variable attenuator 230, RF amplifier 233, directional coupler 232, and AGC control circuit 231. This automatic gain control circuit appropriately regulates the broadband RF signal power to fall within established limits. The common circuitry of FIG. 2 is colocated or closely located to the subscriber units which will be further described in connection with FIG. 3 and may be contained in the same housing.

Also connected to directional coupler 232 is a data receiver 240 for receiving data from the addressable data transmitter 103 located at headend 100. Data receiver 240 receives data transmitted, for example, over a data carrier of 108.2 megahertz and provides unprocessed data to data decoder 250. In accordance with an established protocol and as briefly described above, such data may be in the form of an operation code (command), a subscriber unique address and associated data. Data decoder 250 processes the data and provides the separately transmitted data to microprocessor 260 for further interpretation in accordance with a resident algorithm. Microprocessor 260 is most efficiently chosen to alleviate as many responsibilities from any microprocessor provided for an individual subscriber module and so is most conveniently an eight bit microprocessor having eight kilobytes of internal code such as a Motorola 68HC05C8.

Received data may be stored in uninterruptable memory 270 by microprocessor 260. Data may be temporarily stored in memory 270 or more permanently stored and subsequently downloaded when needed to a subscriber module via a serial peripheral interface bus connecting microprocessor 260 with separate microprocessor 300 associated with each provided subscriber module as shown in FIG. 3.

Variable gain unit 230 regulates the received broadband of picture carriers while the microprocessor 260 controls the jamming carrier level outputs of associated subscriber units within the prescribed range. Microprocessor 260 consequently interprets both global communications addressed to common control circuitry or communications addressed to unique subscriber modules such as service denial commands or both. If appropriate, microprocessor 260 ignores global or addressed communications to other interdiction apparatus 130 or to converter/decoders 150 (FIG. 1). Examples of global communications peculiar to interdiction apparatus 130 are premium channel frequency data and jamming factor data for each premium channel or channel over which premium programming at a particular point in time is provided via headend 100. Examples of addressed communications include communications comprising premium channel or programming authorization information or communications instructing the circuitry to deny or provide service to a particular subscriber.

If two way services over the serving cable are anticipated, a data transmitter (not shown) must be provided in the common control circuitry of FIG. 2 or a separate telephone or other data link from the subscriber location to the headend may be provided. Serial peripheral interface bus 290 may be a two way communications link by way of which link microprocessors 300 (FIG. 3) associated with subscriber modules may, at least, provide status reports to microprocessor 260 upon inquiry.

Radio frequency splitter 280 provides broadband radio frequency signals comprising a broadband cable television service spectrum separately to each subscriber module that is provided.

If a reverse path is required for special additional services, a signal combiner (not shown) of a plug-in special service module may be provided for receiving communications from each of the four subscriber modules in an opposite manner to splitter 280. Certain data may be transmitted back toward the headend via the special service plug-in module (also, not shown) associated with the additional special service.

Referring more particularly to FIG. 3, there is shown an overall block schematic diagram of a subscriber module including a service denial device in accordance with the present invention. A microprocessor 300 is associated with a particular subscriber module and communicates with microprocessor 260 of FIG. 2 over a serial peripheral interface bus. Microprocessor 300 may comprise an eight bit microprocessor equipped with only two kilobytes of code, this microprocessor being relieved of overall control responsibilities by microprocessor 300. Consequently, microprocessor 300 may conveniently comprise a Motorola 68HC05C3 microprocessor or similar unit. Resident algorithms, as will be described further below, may control service denial command interpretation and message and waveform generation associated with service denial.

A reverse path may be provided via a lowpass filter 392 to a special service module (not shown in FIG. 2) of common control circuitry as described in FIG. 2 from a corresponding special service module on the subscriber premises. Such a reverse path is completed to the subscriber via terminal OS. Also, power may be transmitted up the subscriber drop to the module of FIG. 3 and withdrawn via reverse path manifold circuitry as per our patent application Ser. No. 446,695 filed concurrently herewith.

The broadband radio frequency television spectrum signal from FIG. 2 is provided to terminal IS. Referring to the path connecting terminal IS to terminal OS, there are connected in series a service denying switch 389, a radio frequency amplifier 387, a jamming signal combiner 385, and a high pass filter 391.

Service denying switch 389 is shown under the direct control of microprocessor 300. However, in other embodiments, microprocessor 300 may control control signal generation circuitry (not shown) for input to switch 389. In the event of an addressed communication from headend 100 indicating, for example, that a subscriber is to be denied service for non-payment of a bill, service denying switch 389 may be permanently opened. In addition, a high frequency amplifier 387 may be powered down under control of microprocessor 300 whenever service is to be denied. Otherwise, amplifier 387 may be set at discrete gain levels, under microprocessor control, to provide supplemental gain to the broadband television signal if a subscriber has a plurality of television receivers over and above a nominal amount.

In accordance with the present invention, service denial switch 389 may simply comprise a PIN or other simple diode providing limited isolation. The diode chosen should provide desirably at least 20 dB of isolation and preferable 30 or 40 dB but such a level of isolation is considerably less than 60 or 70 dB normally provided in prior art systems.

Under control of the microprocessor 300 and in accordance with the present invention, the switch 389 is repeatedly opened and closed or toggled or the power amplifier 387 is repeatedly powered up and down or both so that a television receiver at the subscriber's premises will not be able to obtain synchronization, and an unviewable image will be displayed. In general, the maximum time a service denial device should remain in either an open or closed toggled position is about the duration of one television field or about 16.7 milliseconds. The minimum time the switch 389 (or amplifier 387 or both) should be in one or the other condition is on the order of the duration of one synch pulse or 4.7 microseconds. These two limits define suitable switching rates of from a frequency of 30 Hertz to hundreds of kilohertz.

An appropriate control signal waveform output SDPS is preferably provided directly by microprocessor 300 for controlling switch 389 but may be provided under control of microprocessor 300 by a special control wave generator (not shown). This toggling control signal SDPS then should generally conform to the switching frequency limits described above and should be asynchronous with respect to the horizontal synchronization pulses of the television signal, thereby avoiding the horizontal line rate of 15,734 hertz, its harmonics or its subharmonics. If these television signal synchronizing frequencies are used to toggle the on/off characteristic of switch 389, a sophisticated television receiver may be able to derive a synchronizing signal from the opening and closing of the service denial device and provide a viewable image.

The switch control waveform SDPS may preferably exhibit a longer period of program denial than program delivery (a longer open condition than closed). In this manner, the television receiver associated therewith will not be able to achieve synchronization at all until the automatic gain control circuit of the television receiver has returned the level of video signal to near a normal level.

Also the same on/off control signal that is used to control the switch 389 may control the powering up and down of amplifier 387 as control signal SDHP. When both switch 389 and amplifier 387 are used for service denial, the combination of the isolation provided by the amplifier and the switch then can be as little as 20 dB.

Also, it may be sufficient to operate the amplifier alone or provide other known substitutes as a program denial device. Such an embodiment in which the amplifier is powered up and down will be described further in connection with a discussion of FIG. 5.

In addition to providing a longer switch open time than closed time, the output signal control waveform of the microprocessor may be intentionally varied in a random or programmed manner within the above defined switching rate limits under program control. A resident software algorithm of the microprocessor may periodically change the parameters of the output waveform at random such as switch open and closed times and switching rate.

Referring briefly to FIG. 4, one exemplary waveform output SDPS, SDHP or both of microprocessor 300 is shown. Waveform SDPS or SDHP of FIG. 4 may be considered a toggling waveform for operating a toggling of either amplifier 387 or switch 389. A 4.7 microsecond "on" time represents the duration of service delivery. Service is off for a period of 68.8 microseconds and the duration of one switching cycle is 73.5 microseconds, avoiding the duration of a horizontal line of NTSC video of 63.5 microseconds duration. As indicated above, the on time may be randomly increased and decreased, and the off time or cycle duration may be randomly increased and decreased by microprocessor 300.

Continuing the discussion of FIG. 3, jamming signals are inserted into the broadband signal path at directional combiner 385 under microprocessor control. Because of the directional characteristic of amplifier 387, jamming signals cannot inadvertently reach the common control circuitry of FIG. 2 or the serving cable 110. Highpass filter 391 prevents any return path signals from reaching combiner 385 and passes the broadband spectrum including any jamming signals toward terminal OS. Reverse path signals, for example in this embodiment, if present, may be radio frequency signals below 30 megahertz. The broadband television spectrum is presumed to be in the 54-550 megahertz range. However, interdiction of premium channel viewing may be allocated anywhere desired within a broader or discontinuous cable television spectrum to be jammed. Consequently, filters 391 and 392 are designed in accordance with this or similarly selected design criteria to block or pass broadband television or reverse path signals as required.

Microprocessor 300, responsive to common microprocessor 260, controls the frequency and power level outputs of four (or five if necessary) voltage controlled oscillators 341-344, each of which oscillators jams premium channel frequencies within an allocated continuous range of frequencies. The frequency of the oscillators is set over leads FREQ1-4 in a manner described in U.S. application Ser. No. 166,302. A power level and on/off operation of the oscillators 341-344 are controlled over leads OPWR1-4.

Since premium programming may be transmitted anywhere in the cable television spectrum, the sum of all such allocated portions comprises the entire television spectrum to be jammed (even where non-premium channels are normally transmitted). In the interdiction system shown, the television spectrum to be jammed may comprise discontinuous portions or intentionally overlapping portions.

A further detailed discussion of frequency control and the interdiction system of FIGS. 1, 2, and 3 may be found in U.S. patent applications Ser. Nos. 166,302 and 279,619.

Referring now to FIG. 5, an arrangement for switching the power on and off to a radio frequency amplifier will be described in more particular detail. Typically an amplifier 387 may not provide a particularly fast response time to power up/down control signals. One amplifier arrangement which permits fast switched operation is a cascode configuration in which first and second transistors T1 and T2 are connected in a collector to emitter configuration where the power up/down control signal is provided to the coupled emitter/collector. Diode D1 may be a simple PIN or simple type 2914 diode to which the control signal output waveform of microprocessor 300 is provided. Diode D1 may be replaced by any suitable electronic or other switch including a transistor. By avoiding excessive capacitive bypassing in the powering of the transistors, i.e. between supply battery VB and ground, the fast switching of the amplifier is not impeded. Furthermore, stepped gain control as described earlier in connection with FIG. 3 is controlled over the same control lead from microprocessor 300.

Referring now to FIG. 6, an alternative power denial device to that disclosed in FIG. 3 is shown in which the switch 389 is replaced by an amplitude modulator or signal multiplier 489. In this embodiment, the incoming broadband spectrum is multiplied by a signal varying in intensity from 0 level to a signal representing full amplitude. Of course, multiplying a signal by zero causes the signal to disappear while multiplying the signal by one permits the signal to pass. The object of any control waveform applied to the signal modulator 489 is still to preclude a sophisticated television signal from achieving synchronization. To this end, practically any waveform involving varying depths of modulation may be applied at modulator 489 to achieve any desired degree of signal obfuscation.

Referring briefly to FIG. 7, a hard on service connect status is represented by the positive going portion of a sine waveform while the negative going portion represents service disconnect. The dashed line represents a threshold level of viewing enjoyment. When a control signal is provided for a duration above this threshold, the viewer may enjoy a perceptible image. When the signal is below this threshold the viewer cannot see a viewable image.

It is a further principle of the present invention that the period of service denial may comprise brief intervals of service delivery followed by long intervals of service denial to encourage subscription to premium television services. That is, during the service denial period, the microprocessor connects service for a brief period of time, for example, ten seconds, and denies service for a longer period of time, for example, thirty seconds. In general, the service connection interval should be on the order of seconds and the service denial interval more on the order of minutes and may be randomly varied within these intervals in accordance with an algorithm of a controlling microprocessor. In this manner, a viewable image will appear for a randomly brief period of time followed by a randomly long interval of viewing a distorted image. The subscriber may be tempted to subscribe or resubscribe by having the opportunity to briefly see and listen to a particular television program.

A fade-in, fade-out operation may be achieved by a periodic or sine wave envelope characteristic of the control waveform of FIG. 7. The multiplier signal, for example, only reaches a one level at the peak of the sine wave and then fades away. In the switched embodiment of FIG. 3, the waveform only reaches the equivalent of a disconnect switch off condition at the peak of the sine wave. Such a fade-in, fade-out waveform effect may be achieved for either embodiment of FIG. 3 or FIG. 6 by wave smoothing and filtering techniques known in the art applied to the output waveform, typically a square wave, of microprocessor 300.

Such a fade-in, fade-out operation of a service disconnect device according to either FIG. 3 or FIG. 6 is not limited to such an application. A fade-in and fade-out for 10 second/30 second or other periodic intervals may be implemented in connection with scrambler or signal conversion or amplifier operation at a headend or with operating a suppressed synch restoration circuit, conversion, amplifier or other descrambler operation of a typical CATV converter/descrambler at a subscriber location.

Thus, in view of FIG. 7 and to achieve a fade-in and fade-out image at a subscriber location equipped with a descrambler, it would be appropriate to apply a sine wave envelope control signal to a scrambler 102 at a headend 100 (FIG. 1). A scrambled output channel would be provided, for example, for a thirty second interval while an unscrambled signal, transmitted in the clear, would be provided, for example, for a ten second interval during the entire duration of a premium program. So-called pay-per-view preview techniques known in the art could not be practically implemented in such a situation from the headend 100.

However, when the descrambler circuitry is similarly controlled by microprocessor 300 at a subscriber location, the fade-in and fade-out of an image may be implemented in addition to known pay-per-view preview techniques by the same microprocessor preview scheduling circuitry. Thus, an initial preview period of, for example, two minutes, may be followed by fade-in, fade-out viewing. Yet, the fade-in, fade-out viewing may be overridden under microprocessor command when further preview is requested by a subscriber and their overall preview time period, for example, five minutes, has not expired.

It is desirable at the time of service disconnect to provide the subscriber with a message screen or series of message screens on a barker or other channel to inform the subscriber as to why their service has been disconnected. Referring now to FIG. 8, a control arrangement will be discussed for controlling the modulator apparatus of FIG. 6 in a manner so as to simultaneously provide a message to a subscriber. Providing a message in this embodiment involves the same circuitry that is disrupting the subscriber's service.

In accordance with FIG. 8, the microprocessor 300 is not coupled directly to modulator 489 but rather provides a message driving input to a character and synch generator 800. Responsive to the data field of an addressed subscriber disconnect command, microprocessor 300 formulates an appropriate message or series of message screens and controls the generation of the message by character generator 800. The output of the character and synch generator 800 is an output waveform represented by waveform 801 comprising characters and synch pulses. This complex waveform 801 is applied at modulator 489 and effectively modulates the broadband of radio frequency television signals so as to deny service on all television channels. However, in accordance with this embodiment, one channel transmitted from headend 100 is not a television channel but rather provides a continuous wave carrier having no video signal applied. The continuous wave carrier signal then is modulated by the output of the character and synch generator 800 at modulator 489 so that a subscriber may tune to the channel for the continuous wave carrier frequency and view the personal message represented by the modulating waveform 801. Thus, the subscriber may learn why their service is disconnected, and the same circuitry that is used for achieving the disconnect is used for providing the disconnect message. When service is reconnected, the disconnect message automatically disappears.

Now, in the embodiment of FIG. 8, character generator 800 is provided on a per subscriber basis. In an interdiction system having common circuitry according to FIG. 2, the character generator may comprise a portion of the common circuitry and be shared in time by the subscriber units according to FIG. 3. Also, in the embodiment of FIG. 8, character generator 800 provides a synchronized waveform output and a continuous wave carrier channel is involved. To save costs of providing a more expensive character generator, and in accordance with FIG. 9, an embodiment will be described in which a television data or message channel is reserved for subscribed commands or messages which, of course, is properly synchronized. The message data is provided as modulation during the vertical blanking interval of the television channel.

Referring briefly to either the embodiment of FIG. 3 or FIG. 6, a broadband RF signal IS is provided as an input to channel filter 901 of FIG. 9 at the same time as it is provided to disconnect switch 389 (FIG. 3) or modulator 489 (FIG. 6). Now referring to FIG. 9, channel filter 901 passes the selected television message data channel to channel demodulator 902 where it is demodulated to baseband video and provided simultaneously to synch stripper 904 and to vertical blanking interval data receiver 903. Synch is stripped from the incoming baseband television waveform and is used as a synchronizing input to simple character generator 905 which does not, then, have to generate its own synch.

The vertical blanking interval data receiver, as is known in the art, recovers the data message from designated lines of the vertical blanking interval, for example, as is permitted by United States Federal Communications Commission regulations, from lines after the tenth line of the vertical interval.

The recovered data message is forwarded to microprocessor 300 which drives the character generator 905 to output a message control signal waveform similar to message waveform 801 of FIG. 8, except that synchronization information is not needed as it is provided from the headend. As already described the waveform 801 obfuscates the broadband radio frequency spectrum at control modulator 489 of FIG. 6. However, the continuous wave carrier frequency is modulated so as to provide a viewable message on its associated channel. Also referring to both FIGS. 3 and 9, microprocessor 300 also may operate a subscriber disconnect switch such as switch 389, or power up and down a power amplifier 387 or provide a separate modulation control signal.

Thus there has been described a number of embodiments of a service denial device which achieves the objectives sought including the objectives of providing limited isolation, saving costs of subscriber equipment and delivering personal messages explaining why service is disconnected via the same circuitry. Other variations on the depicted embodiments should be considered to fall within the skill of a cable television design engineer without departing from the principles of the present invention. While the invention was primarily disclosed in the context of an interdiction system, its principles apply equally to other television delivery systems including broadcast subscription television systems. Thus, the present invention should only be deemed limited in scope by the claims which follow.

What is claimed is:

1. Service denial apparatus for use in a television service delivery system for automatically denying service from a service source to a service subscriber wherein the delivery system includes the delivery of a television signal having periodic horizontal synchronization pulses and vertical field intervals, the service denial apparatus comprising:
    control means for generating a control signal; and
    service denial means, responsive to the control signal, for switchably regulating the denial of service, said denial means being disposed between the service source and the subscriber and adapted to substantially vary the amplitude of said service when switched from a first state to a second state;
    the control signal being continuously generated during a service disconnect period and having on and off periods, each having predetermined durations within a range of durations between the duration of a horizontal synchronizing pulse and the duration of a vertical field interval, the predetermined durations being further predetermined to avoid durations related to the horizontal synchronization of the television signal.

2. A service denial apparatus according to claim 1 wherein said service denial means comprises a diode switch.

3. Service denial apparatus for use in a television service delivery system for automatically denying television service from a service source to a subscriber wherein the delivery system includes the delivery of a broadband television signal comprising a plurality of program signals, each program signal having periodic horizontal and vertical synchronization pulses and vertical field intervals, the service denial apparatus comprising:
    a controller for generating a control signal during a period of service denial;
    a service denial device, disposed between the service source and the subscriber having an input coupled to the service source and an output coupled to the subscriber, which is adapted to substantially vary the amplitude of said broadband television signal when toggled from a first state to a second state in response to said control signal; and
    said service denial device being toggled between said first and second states at a rate which varies the amplitude or duration of the horizontal and vertical synchronization pulses in a manner which precludes a television receiver coupled to the output of the device from achieving synchronization.

4. The service denial apparatus of claim 3, wherein the duration said device is either maintained in the first or second toggled state is predetermined to fall within the range of durations between the duration of a synchronization pulse and the duration of a television field.

5. The service denial apparatus of claim 4, wherein the first toggled state is maintained for a shorter interval than the second toggled state.

6. The service denial apparatus of claim 4, the controller generating the control signal to randomly vary the first and second state durations.

7. The service denial apparatus of claim 3, wherein:
    the service denial device includes a signal modulator.

8. The service denial apparatus of claim 2 wherein:
    the service denial device includes a radio frequency amplifier.

9. The service denial apparatus of claim 3 wherein:
    the service denial device includes a diode switch.

10. The service denial control apparatus of claim 7, further comprising a character generator coupled between the controller and the signal modulator, the signal modulator modulating a continuous wave carrier signal received by the service denial control apparatus with a message signal generated by the character generator while television service is denied.

11. The service denial apparatus of claim 10 wherein the character generator is responsive to the controller and which further includes:
    a synch stripper for extracting television signal synchronization signals from a selected television channel of the television service.

12. A service denial apparatus according to claim 3 wherein said service denial device comprises a radio frequency amplifier arranged as a cascode connection of first and second transistors, the base of said first transistor forming said input of said service denial device and the collector of said second transistor forming the output of said service denial device, the emitter of said second transistor being joined to the collector of the first transistor, and an electronic control switch coupled to the emitter-collector junction which is responsive to said control signal.

13. A method of denying television service to a subscriber wherein the service includes the delivery of a broadband of television signals, each television signal having periodic horizontal and vertical synchronization pulses and vertical field intervals, comprising the steps of:
    during a period of service delivery, delivering television service to the subscriber;
    at the time of a period of service denial, transmitting a subscriber service disconnect message uniquely addressed to a subscriber unit;
    responsive to receiving the uniquely addressed message, obfuscating the television service provided to the addressed subscriber during a period of service denial;

said television service obfuscation step including toggling a service denial device between first and second states wherein the service denial device substantially varies the amplitude of said broadband of television signals when switched between said first and second states; and toggling said service denial device between said first and second states asynchronously with said synchronizing pulses at a rate which at least varies the amplitude or duration of the horizontal and vertical synchronization pulses in a manner which precludes a television receiver coupled to the output of the device from achieving synchronization.

14. The method of television service denial according to claim 13, the signal device of the signal obfuscation step comprising a signal modulator, the signal obfuscation step further comprising the step of:

modulating a message signal on a continuous wave carrier signal for delivering a message to a subscriber indicating why service is disconnected.

15. The method of television service denial according to claim 13, the signal device of the signal obfuscation step comprising a signal modulator, the signal obfuscation step further comprising the step of:

modulating a message signal on a carrier signal bearing vertical and horizontal synch information, the message signal for delivering a message to a subscriber indicating why service is disconnected.

16. Service denial apparatus for use in a television service delivery system for automatically denying television service from a service source to a subscriber wherein the delivery system includes the delivery of a broadband television signal comprising a plurality of program signals, each program signal having periodic horizontal and vertical synchronization pulses and vertical field intervals, the service denial apparatus comprising:

a controller for generating a control signal during a period of service denial;

a service denial device, disposed between the service source and the subscriber having an input coupled to the service source and an output coupled to the subscriber, which is adapted to substantially vary the amplitude of the broadband signal and switch said service on and off when said service denial device is toggled from a first state to a second state in response to said control signal; and said service denial device being toggled between said first and second states at a rate which varies the amplitude or duration of the horizontal and vertical synchronization pulses in a manner which precludes a television receiver coupled to the output of the device from achieving synchronization.

17. A service denial apparatus according to claim 16 wherein said service denial device comprises a radio frequency amplifier coupled serially to a diode switch, each being responsive to said control signal.

18. An interdiction apparatus for use in a television service delivery system for automatically denying television service from a service source to a subscriber wherein the delivery system includes the delivery of a broadband television signal comprising a plurality of program channels, each program channel having periodic horizontal and vertical synchronization pulses and vertical field intervals, the interdiction apparatus comprising:

a controller for generating a control signal during a period of service denial;

a service denial device, disposed between the service source and the subscriber and having an input coupled to the source and an output coupled to the subscriber, which is adapted to substantially vary the amplitude of the broadband signal when toggled from a first state to a second state in response to said control signal; and said service denial device being toggled asynchronously to said synchronizing pulses between said first and second states at a rate which precludes a television receiver coupled to the output of the device from achieving synchronization.

* * * * *